United States Patent
Strasser et al.

(10) Patent No.: US 6,533,976 B1
(45) Date of Patent: Mar. 18, 2003

(54) METHOD OF FABRICATING CERAMIC MATRIX COMPOSITES EMPLOYING A VACUUM MOLD PROCEDURE

(75) Inventors: Thomas Edward Strasser, Corona, CA (US); Mark William Bland, Camarillo, CA (US); Steven Donald Atmur, Morrisonville, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/521,003

(22) Filed: Mar. 7, 2000

(51) Int. Cl.[7] .............................................. C04B 35/80
(52) U.S. Cl. ......................... 264/87; 264/670; 264/101
(58) Field of Search ........................ 264/87, 101, 641, 264/624–26, 653, 654, 669, 670, 29.1, 29.7, 517, 541; 425/405.1, 405.2, 85, DIG. 60

(56) References Cited

U.S. PATENT DOCUMENTS

| | | | |
|---|---|---|---|
| 3,880,972 A | | 4/1975 | Towne et al. |
| 4,320,079 A | * | 3/1982 | Minnear et al. ............... 249/62 |
| 4,488,862 A | * | 12/1984 | Epel et al. ................... 156/382 |
| 4,612,149 A | * | 9/1986 | Iseler et al. ................. 264/101 |
| 5,039,371 A | | 8/1991 | Cremens et al. |
| 5,156,856 A | | 10/1992 | Iwasaki et al. |
| 5,370,521 A | * | 12/1994 | McDougall ................. 264/102 |
| 5,427,722 A | * | 6/1995 | Fouts et al. .................... 264/86 |
| 5,594,216 A | | 1/1997 | Yasukawa et al. |
| 5,729,970 A | * | 3/1998 | Atmur et al. |
| 5,738,818 A | * | 4/1998 | Atmur et al. ................ 264/624 |
| 5,902,613 A | * | 5/1999 | Ritchie et al. ............... 425/257 |
| 6,030,563 A | * | 2/2000 | Strasser et al. ............. 264/101 |
| 6,153,291 A | * | 11/2000 | Strasser ...................... 264/257 |
| 6,210,786 B1 | * | 4/2001 | Atmur et al. ............. 428/293.4 |
| 6,277,313 B1 | * | 8/2001 | Strasser et al. .......... 264/71.29 |

* cited by examiner

Primary Examiner—Mary Lynn Theisen

(57) ABSTRACT

A method of fabricating a discontinuous-fiber, ceramic matrix green-state composite component. The method includes preparation of a mixture of discontinuous fibers, in a quantity equal to about 100% of a desired end-product fiber quantity thereof, and a polymer-derived ceramic precursor resin in an excess quantity greater than about 150% of a desired end-product resin quantity thereof. The mixture so prepared then is introduced into a cavity of a molding tool and a vacuum is applied to the cavity through a vacuum aperture leading from the cavity. The mixture is drawn toward the vacuum aperture and consequently compacts a quantity of fibers within the cavity at the aperture site such that the fibers function as a filter to efficiently retain within the cavity fibers within the original mixture while removing under vacuum the excess resin that provided an effective vehicle for carrying and dispersing the discontinuous fibers. Finally, the molding tool is heated to a temperature and for a time sufficient to cure the resin/fiber mixture within the cavity and thereby fabricate the green-state composite component in a structurally sound manner.

12 Claims, 1 Drawing Sheet

METHOD OF FABRICATING CERAMIC MATRIX COMPOSITES EMPLOYING A VACUUM MOLD PROCEDURE

FIELD OF THE INVENTION

This invention relates in general to composite components, and in particular to methodology for fabricating a discontinuous-fiber, ceramic matrix composite component wherein a mixture of discontinuous fibers and an excess of ceramic precursor resin is introduced under vacuum to a mold cavity whereby the excess resin provides a fiber transport medium which, as the fibers compact at a vacuum aperture of the mold cavity and there function as a filter, is permitted to escape through the aperture while the fibers so transported are retained within the cavity for structural incorporation.

BACKGROUND OF THE INVENTION

In general, the use of a mold cavity to manufacture various components is widely practiced, with among the most frequent usage being the construction of plastic products functional for immediate use or for incorporation into a secondary product. Simultaneously, because of superior high-temperature strength characteristics, the use of discontinuous-fiber ceramic matrix composite materials for the construction of various components is well recognized. However, employment of a traditional compression molding process for such composite materials, especially in the fabrication of a relatively long and thin-walled ceramic matrix component, many times creates a twofold problem. First, in order to mix a resin/fiber mixture to a flowable consistency for mold introduction, a finished product generally results that have resin-rich areas toward the bottom of the mold cavity and resin-starved areas toward the top (compression plunger side) as the resistance to flow of the molding cavity increases as the mold fills. As this occurs, the compression plunger squeezes resin out of the fiber at the top of the mold in a manner much like that of squeezing water from a sponge. Second, as the conventional compression plunger of the mold tool pushes the resin/fiber mixture into the mold cavity, moisture-starved fibers, especially near the plunger entry, are produced within the mixture. Consequently, sub-standard end products can be produced.

In view of the potential shortfalls that can occur in traditional mold-forming techniques, it is apparent that a need is present for mold methodology wherein adequate and uniform distribution of quality fibers occurs throughout a ceramic matrix composite component to be formed within a mold cavity. Accordingly, a primary object of the present invention is to provide methodology for fabricating a discontinuous-fiber, green-state ceramic matrix composite component wherein fiber concentration, fiber quality and fiber distribution are in accord with end-product structural requirements.

Another object of the present invention is to provide such methodology wherein a resin-rich resin/fiber mixture is introduced into a mold cavity, preferably via a charging station upstream of the mold cavity, from which a vacuum aperture permits movement of the fiber throughout the mold cavity followed by extraction of excess resin and retention of fibers.

Still another object of the present invention is to provide such methodology wherein vacuum-driven resin/fiber mixture entry into the mold cavity eliminates active plunger compression activity and attendant resin starvation and potential fiber damage.

These and other objects of the present invention will become apparent throughout the description thereof which now follows.

SUMMARY OF THE INVENTION

The present invention is a method of fabricating a discontinuous-fiber, green-state ceramic matrix composite component comprising three steps in sequence. The initial step is the preparation of a mixture of, first, discontinuous fibers in a quantity equal to about 100% of a desired end-product fiber quantity thereof, and, second, a pre-ceramic resin in an excess quantity greater than about 150% of a desired end-product resin quantity thereof. The discontinuous fibers are preferably cured-resin coated and preferably prepared in accord with the methodology taught in commonly assigned pending U.S. patent application Ser. No. 09/170,004, filed Oct. 13, 1998, now U.S. Pat. No. 6,066,004 and incorporated herein in its entirety. Briefly, discontinuous fiber preparation is achieved by first thoroughly wetting or coating a fiber with a resin, second, permitting the fiber to drip dry to remove excess resin, third, chopping the fiber into a discontinuous state, and fourth, curing the resin of these discontinuous fibers.

The mixture of discontinuous fibers and ceramic precursor resin so prepared then is poured into the charge station forward of the opening into a cavity of a molding tool and a vacuum is applied to the cavity through a vacuum aperture leading from the cavity. This step draws the mixture toward the vacuum aperture and consequently compacts a quantity of fibers within the cavity at the aperture site such that the fibers function as a filter to efficiently retain within the cavity all fibers within the original mixture while removing under vacuum the excess resin that provided an effective vehicle for carrying and dispersing the discontinuous fibers. As the final step, the molding tool is heated to a temperature and for a time sufficient to cure the resin/fiber mixture within the cavity to thereby fabricate the composite component in a structurally sound manner.

In presently preferred methodology, the resin is a pre-ceramic polymer and is initially present in an amount of about 200% of the desired end-product resin quantity and with a viscosity between 5,000 and 10,000 CPS. Polymer-derived ceramic precursor resins are non-limitedly exemplified in BLACKGLAS (AlliedSignal Corporation [e.g. resin no. 493E]), CERASET (AlliedSignal Corporation), SYLRAMIC (Engineering Ceramics, Inc.), and STARFIRE (Starfire Corporation) resins, while fiber identity is non-limitedly exemplified in a group consisting of alumina, Nextel 312, Nextel 440, Nextel 510, Nextel 550, silicon nitride, silicon carbide, HPZ, graphite, carbon, peat, and mixtures thereof. The fibers can be coated with an interface material to inhibit the resin from adhering directly to the fibers. Such interface material non-limitedly can be chosen from the group consisting of carbon, silicon nitride, silicon carbide, silicon carboxide, and boron nitride, and can be of a thickness of about 0.1 to about 5.0 microns. Preferred fiber configuration is a cylindrical shape having a length between about 0.125 inch to about 0.25 inch, thus, for purposes of size comparison, very much like the appearance of rice.

Pouring the resin/fiber mixture into the charge station situated upstream from and in communication with the mold cavity and applying vacuum to the cavity through a vacuum aperture at the distal end of the cavity draws resin and fiber toward the vacuum aperture while causing movement (due to pressure differential) of a standard compression plunger into the charge station to thereby disperse an effective resin/fiber mixture within the mold subsequent to vacuum removal of excess resin originally present as a vehicle for fiber transport. Thereafter, the resin/fiber mixture within the mold is conventionally cured within the mold tool by heating the tool to the appropriate temperature for the appropriate time in accord with curing characteristics of the resin. Upon completion of the curing process, the green-state component can be removed from the mold and is ready for pyrolysis to thereby accomplish conversion to a ceramic.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
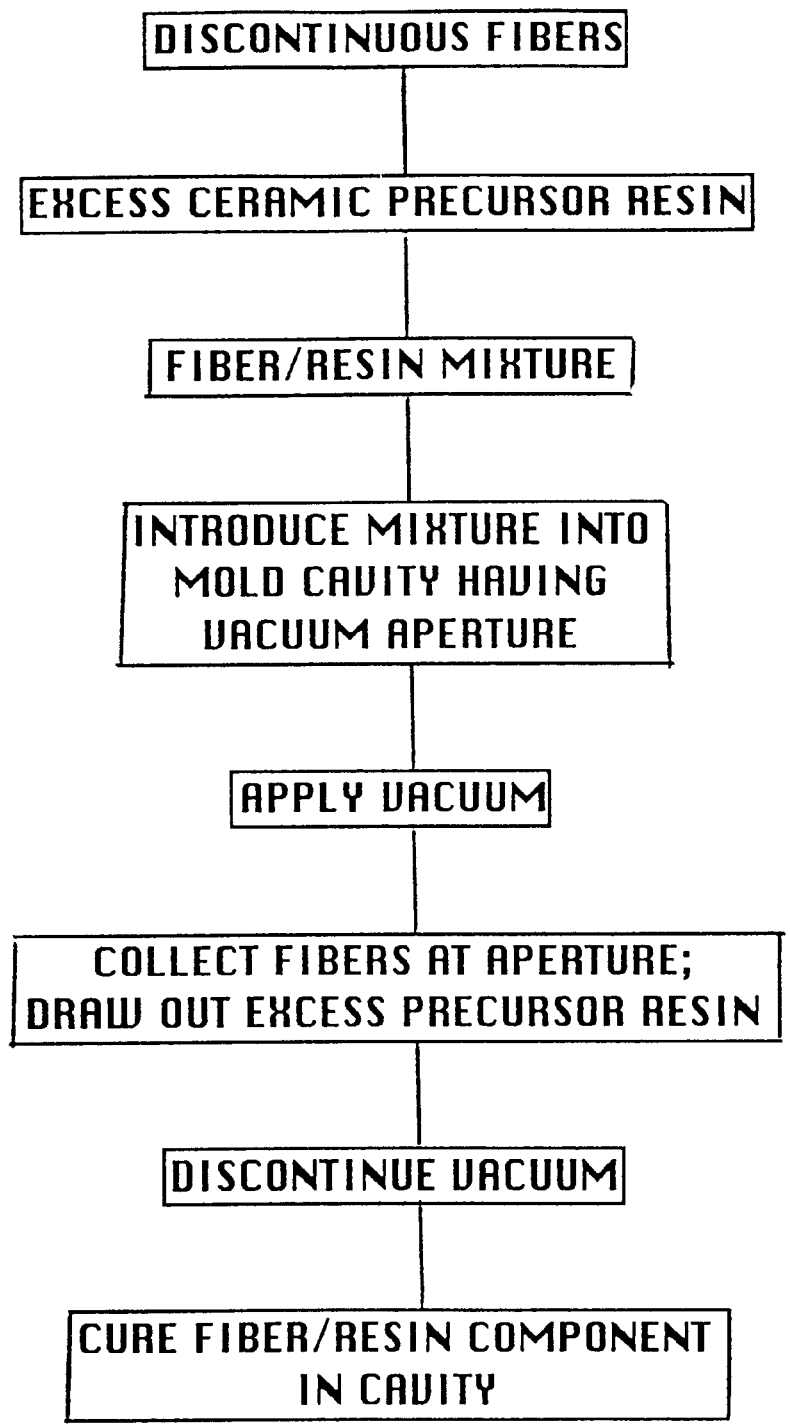
FIG. 1 is a flow diagram outlining methodology for the fabrication of a discontinuous-fiber, ceramic matrix composite component within a mold cavity.

Referring to the flow diagram of FIG. 1, a mixture of discontinuous fibers and ceramic precursor resin is prepared for subsequent introduction into a cavity of a mold tool for ultimate fabrication of a resin/fiber component. Such a component can be an independent structure, or it can be an element of a larger apparatus. In either event, of course, the component is constructed in accord with strength requirements through proper choice of resin characteristics and fiber concentration. Resin choice preferably is a pre-ceramic polymer-forming resin and most preferably is chosen from the group consisting of BLACKGLAS, CERASET, SYLRAMIC, and STARFIRE resins. Fiber preferably is chosen from the group consisting of alumina, Nextel 312, Nextel 440, Nextel 510, Nextel 550, silicon nitride, silicon carbide, HPZ, graphite, carbon, peat, and mixtures thereof. The fibers are discontinuous, fabricated as earlier defined, have an interfacial coating as earlier described, and preferably are generally cylindrical and of a length between about 0.125 inch to about 0.25 inch. Mixture preparation is such that the fiber content of the mixture is substantially 100% of the desired end-product fiber quantity which typically is 30%–45% fiber volume of the component being fabricated, while ceramic precursor resin is present in the mixture in an excess quantity greater than about 150%, and preferably 200%, of the desired end-product resin quantity of the component. As recognized by those skilled in the art, such end-product quantities, as well as fiber and resin identities, are determined by the particular intended function of the end product with respect to required durability, structural integrity, manufacturability, service length, and the like.

It also is to be noted that, in addition to fiber volume being desirably high to thereby improve strength and ductility, some material applications benefit from the addition of fillers into the resin/fiber matrix to tailor mechanical, electrical, and other characteristics of a molded part. Fillers such as non-limitedly exemplified by silicon carbide are typically provided as small particles (i.e. about 1–50 microns in diameter) that tend to lodge within interstices of packed fibers and therefore are generally uniformly distributed throughout the matrix. As is apparent, of course, when fillers are added, such fillers and fibers compete for volumetric space within the matrix, thereby necessitating an educated balance of beneficial fiber volume versus filler presence in accord with the needed utility of a molded product.

Referring once again to FIG. 1, a mixture of fibers and excess ceramic precursor resin is formed. This mixture is pourable into a conventional charging station immediately upstream from and in communication with a mold cavity, and, because of fiber-resin ratio, would not yield a usable composite component if allowed to cure as-is. With the exception of its mold cavity being modified, as would be recognizable by a skilled artisan, to have an aperture leading from the bottom of the cavity and to which a vacuum source can be applied (thus, a "vacuum aperture"), a generally standard molding tool with top-disposed transfer chamber is employed, while a compression plunger fits within the charging station. The prepared mixture is introduced from the charging station into the transfer chamber and the plunger is non-pressuredly, except for its own weight, inserted in place. A "hard" vacuum (greater than 29" Hg) is then drawn on the tool through the vacuum aperture and the resin-rich mixture is thereby drawn into the mold cavity. Under such vacuum pressure, fibers naturally collect and compact at the vacuum aperture to thus function as a filter through which the excess precursor resin flows while the fibers also simultaneously retain themselves within the cavity for incorporation in the resin/fiber component. After an operator has withdrawn the excess precursor resin, whose quantity is known from the amount of precursor resin initially added to form the mixture, vacuum application is terminated and the resultant mixture present within the cavity has substantially 100% of desired fiber and precursor resin quantities to adequately fabricate the finished component. The mold tool then is heated as required in accord with characteristics of the precursor resin within the mold cavity to thereby create the green-state component and yield a correctly fabricated finished component ready for conversion to a ceramic. Such conversion to a finished end product includes pyrolysis to effectuate resin cure, and additionally can include an infiltration process as known in the art whereby a pyrolyzed end product is immersed in a pre-ceramic resin which fills pores formed during the preceding pyrolysis. The product is then subjected to a second pyrolysis where the pore-disposed resin is converted to ceramic. This immersion/pyrolysis procedure can be repeated a number of times until pore filling has reached a desired level.

In this manner, a finished end product can be effectively and efficiently produced using an easily pourable precursor mixture of starting ingredients whose end-product characteristics are tailored by choice of such ingredients for ready manifestation upon curing. Thus, while an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of fabricating a discontinuous-fiber, ceramic matrix green-state composite component, the method comprising the sequential steps of:

a) preparing an initial mixture of discontinuous fibers in a quantity equal to about 100% of a desired end-product fiber quantity thereof, and a ceramic precursor resin in an excess quantity greater than about 150% of a desired end-product resin quantity thereof;

b) introducing said mixture under vacuum into a cavity of a molding tool such that the fibers are transported into the mold as a component of the vacuum and resin mixture;

c) compacting a quantity of fibers at a vacuum aperture by applying a vacuum to the cavity at a vacuum aperture to thereby draw said mixture toward the aperture whereby said compacted fibers functions as a filter to retain within the cavity fibers within the mixture while removing under vacuum excess ceramic precursor from said mixture; and d) heating the molding tool to a temperature and for a time sufficient to cure the mixture to thereby fabricate the green-state component.

2. A method as claimed in claim 1 wherein the ceramic precursor resin is present in the initial mixture in an excess quantity of about 200% of the desired end-product resin quantity.

3. A method as claimed in claim 1 wherein the ceramic precursor resin is a polymer forming resin.

4. A method as claimed in claim 1 wherein the fiber is chosen from the group consisting of alumina, silicon nitride, silicon carbide, graphite, carbon, peat, and mixtures thereof.

5. A method as claimed in claim 1 wherein the discontinuous fibers are cylindrical of a length between about 0.125 inch to about 0.25 inch.

6. A method of fabricating a discontinuous-fiber, ceramic matrix green-state composite component, the method comprising the sequential steps of:

a) preparing an initial mixture of discontinuous fibers in a quantity equal to about 100% of a desired end-product fiber quantity thereof, and a pre-ceramic polymer forming resin in an excess quantity greater than about 150% of a desired end-product resin quantity thereof, with said discontinuous fibers being cylindrical and of a length between about 0.125 inch to about 0.25 inch;

b) introducing said mixture into a cavity of a molding tool under vacuum such that the fibers are transported into the mold as a component of the fiber and resin mixture, and compacted at a vacuum aperture where said quantity of fibers functions as a filter to retain within the cavity fibers within the mixture while removing under vacuum excess resin from said mixture; and c) heating the molding tool to a temperature and for a time sufficient to cure the mixture to thereby fabricate the green-state composite component.

7. A method as claimed in claim 6 wherein the fiber is chosen from the group consisting of alumina, silicon nitride, silicon carbide, graphite, carbon, peat, and mixtures thereof.

8. A method of fabricating a discontinuous-fiber, ceramic matrix green-state composite component, the method comprising the sequential steps of:

a) preparing the initial mixture of discontinuous fibers in a quantity equal to about 100% of a desired end-product fiber quantity thereof, and a pre-ceramic resin in excess quantity of about 200% of a desired end-product resin quantity thereof;

b) introducing said mixture into a cavity of a molding tool under vacuum such that the fibers are transported into the mold as a component of the fiber and resin mixture, and compacted at a vacuum aperture where the compacted fibers function as a filter to retain within the cavity fibers within the mixture while removing under vacuum excess resin from said mixture; and c) heating the molding tool to a temperature and for a time sufficient to cure the mixture to thereby fabricate the green-state composite component.

9. A method as claimed in claim 8 wherein the pre-ceramic resin is a polymer forming resin.

10. A method as claimed in claim 9 wherein the fiber is chosen from the group consisting of alumina, silicon nitride, silicon carbide, graphite, carbon, peat, and mixtures thereof.

11. A method as claimed in claim 8 wherein the discontinuous fibers are cylindrical of a length between about 0.125 inch to about 0.25 inch.

12. A method of fabricating a discontinuous-fiber, ceramic matrix green-state composite component, the method comprising the sequential steps of:

a) preparing an initial mixture of discontinuous cylindrical fibers of a length between about 0.125 inch to about 0.25 inch chosen from the group consisting of alumina, silicon nitride, silicon carbide, graphite, carbon, peat, and mixtures thereof in a quantity equal to about 100% of a desired end-product fiber quantity thereof, and a pre-ceramic resin in an excess quantity of about 200% of a desired end-product resin quantity thereof;

b) introducing said mixture into a cavity of a molding tool under vacuum such that the fibers are transported into the mold as a component of the fiber and resin mixture, and compacted at a vacuum aperture where the compacted fibers function as a filter to retain within the cavity fibers within the mixture while removing under the vacuum excess resin from said mixture; and c) heating the molding tool to a temperature and for a time sufficient to cure the mixture to thereby fabricate the green-state composite component.

* * * * *